United States Patent
Shimauchi

(10) Patent No.: US 12,397,616 B2
(45) Date of Patent: Aug. 26, 2025

(54) HEAT MANAGEMENT SYSTEM FOR VEHICLE

(71) Applicant: TOYOTA JIDOSHA KABUSHIKI KAISHA, Aichi-ken (JP)

(72) Inventor: Takayuki Shimauchi, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 183 days.

(21) Appl. No.: 18/483,526

(22) Filed: Oct. 10, 2023

(65) Prior Publication Data

US 2024/0131900 A1 Apr. 25, 2024
US 2024/0227503 A9 Jul. 11, 2024

(30) Foreign Application Priority Data

Oct. 21, 2022 (JP) .................. 2022-169430

(51) Int. Cl.
| | |
|---|---|
| *F24F 7/00* | (2021.01) |
| *B60H 1/00* | (2006.01) |
| *B60H 1/12* | (2006.01) |
| *B60H 1/22* | (2006.01) |
| *B60H 3/02* | (2006.01) |

(52) U.S. Cl.
CPC ..... *B60H 1/00885* (2013.01); *B60H 1/00278* (2013.01); *B60H 1/12* (2013.01); *B60H 1/2221* (2013.01); *B60H 3/024* (2013.01); *B60H 2001/00307* (2013.01); *B60H 2001/00928* (2013.01); *B60H 2001/00949* (2013.01)

(58) Field of Classification Search
CPC .. B60H 1/00885; B60H 1/00278; B60H 1/12; B60H 1/2221; B60H 3/024; B60H 2001/00307; B60H 2001/00928; B60H 2001/00949
USPC .......................................................... 165/59
See application file for complete search history.

(56) References Cited

U.S. PATENT DOCUMENTS

2012/0241139 A1* 9/2012 Katoh ................ B60H 1/00042
165/104.19

FOREIGN PATENT DOCUMENTS

| CN | 114714860 A | * | 7/2022 | |
| DE | 102016112089 A1 | * | 1/2018 | ............. B60H 1/323 |
| JP | 2018-103643 A | | 7/2018 | |

* cited by examiner

*Primary Examiner* — Davis D Hwu
(74) *Attorney, Agent, or Firm* — HAUPTMAN HAM, LLP

(57) ABSTRACT

When front and rear air conditioning units perform dehumidification heating operation, and when a battery is to be cooled, a refrigeration cycle circuit performs cooling operation and supplies a liquid-phase refrigerant to front and rear evaporators and a battery cooling heat exchanger. A heating circuit supplies a high temperature liquid heated by an electric heater to front and rear heater cores. Air cooled by the front and rear evaporators is warmed by the front and rear heater cores and supplied to a passenger compartment. A battery cooling liquid cooled by the battery cooling heat exchanger is delivered to the battery and cools the battery.

3 Claims, 8 Drawing Sheets

HEAT MANAGEMENT SYSTEM FOR VEHICLE

CROSS REFERENCE TO RELATED APPLICATION

This application claims priority to Japanese Patent Application No. 2022-169430 filed on Oct. 21, 2022, which is incorporated herein by reference in its entirety including the specification, claims, drawings, and abstract.

TECHNICAL FIELD

The present disclosure relates to a heat management system for air conditioning a passenger compartment of a vehicle and managing temperature of vehicle-mounted equipment.

BACKGROUND

JP 2018-103643 A discloses a vehicle that includes a front air conditioning unit (2) for delivering air having adjusted temperature and humidity to a front side space of a passenger compartment and a rear air conditioning unit (3) for delivering air having adjusted temperature and humidity to a rear side space of the passenger compartment. The front and rear air conditioning units (2, 3) respectively include a heater core (27, 48) and an evaporator (26, 47), enabling air conditioning of the passenger compartment independently for the front side space and the rear side space.

There is also known an air conditioner for a vehicle, the air conditioner being configured to perform a dehumidification heating operation in which air is heated using a heater core while being dehumidified as it is cooled using an evaporator in a predetermined region that is determined based on a relationship between outside air temperature and temperature of air blown from an air conditioning unit.

It should be noted that reference numerals in the parentheses above are reference numerals used in JP 2018-103643 A, which are unrelated to reference numerals used herein.

In a structure wherein a refrigeration cycle circuit for an air conditioning unit is used for cooling a battery that supplies power to a motor that drives a vehicle, sufficient air conditioning and sufficient battery cooling sometimes cannot be performed when a refrigerant is supplied to front and rear air conditioning units and the refrigerant is further supplied for cooling the battery. During, in particular, the dehumidification heating operation of the air conditioner, the refrigerant that is supplied to the evaporators of the front and rear air conditioning units and to a battery cooling heat exchanger may be in a gas-liquid two-phase state. This causes a possibility that the flow rate of the refrigerant that is supplied to the evaporators and to the battery cooling heat exchanger cannot be controlled sufficiently, resulting in failure to achieve demanded air conditioning performance and battery cooling performance.

SUMMARY

The present disclosure provides a vehicle heat management system that enables demanded air conditioning performance and battery cooling performance in a dehumidification heating operation region.

According to an aspect of the present disclosure, there is provided a heat management system for a vehicle, the heat management system comprising a front air conditioning unit configured to perform air conditioning of a front side space of a passenger compartment of the vehicle; a rear air conditioning unit configured to perform air conditioning of a rear side space of the passenger compartment; a battery cooling circuit configured to circulate a cooling liquid for cooling a battery from which power is supplied to an electric motor for driving the vehicle; a refrigeration cycle circuit configured to supply a refrigerant to the front air conditioning unit and the rear air conditioning unit and configured to supply the refrigerant to a battery cooling heat exchanger for exchanging heat between the cooling liquid of the battery cooling circuit and the refrigerant; and a heating circuit configured to produce a high temperature liquid using a heat source or the refrigerant of the refrigeration cycle circuit and configured to supply the high temperature liquid to the front air conditioning unit and the rear air conditioning unit. A dehumidification heating operation region is defined based on an outside air temperature and a demanded blowing air temperature representing a target value to which a temperature of air fed from the front air conditioning unit and the rear air conditioning unit is controlled. When the front air conditioning unit and the rear air conditioning unit are operating in the dehumidification heating operation region, and when a demand to cool the battery is greater than or equal to a first demand value, the refrigeration cycle circuit performs cooling operation to supply the refrigerant to the front air conditioning unit, the rear air conditioning unit, and the battery cooling heat exchanger. Also, the heating circuit produces the high temperature liquid using the heat source. Further, the battery cooling circuit cools the battery using the cooling liquid cooled by the refrigerant of the refrigeration cycle circuit through the battery cooling heat exchanger.

The refrigeration cycle circuit performs cooling operation, thereby turning the refrigerant into a liquid phase only. This enables delivery of the liquid-phase refrigerant to the front air conditioning unit, the rear air conditioning unit, and the battery cooling heat exchanger.

In the above-described heat management system for a vehicle, when the demand to cool the battery is greater than or equal to a second demand value that is higher than the first demand value, and when an amount of electricity stored in the battery is less than a predetermined value, supply of the refrigerant to the front air conditioning unit and the rear air conditioning unit by the refrigeration cycle circuit may be suspended. A reduction in power consumed by the refrigeration cycle circuit enables a longer maximum driving range achievable by the electric motor.

In the above-described heat management system for a vehicle, the refrigeration cycle circuit may include a compressor configured to compress the refrigerant and an exterior heat exchanger configured to exchange heat with outside air, enabling, during the cooling operation, the entire amount of the refrigerant that has been compressed by the compressor and discharged to pass through the exterior heat exchanger and turn into a liquid.

In the above-described heat management system for a vehicle, the heat source of the heating circuit may comprise one or both of an engine for driving the vehicle and an electric heater.

Under circumstances where the front air conditioning unit and the rear air conditioning unit are both operating in the dehumidification heating operation region, and where the battery should be cooled, the refrigerant that has turned into a liquid phase can be delivered to the front and rear air conditioning units and the battery cooling heat exchanger. The amounts of refrigerant delivered to the front air conditioning unit, the rear air conditioning unit, and the battery cooling heat exchanger can be adjusted more appropriately than with a structure in which a gas-liquid two-phase refrigerant is delivered.

BRIEF DESCRIPTION OF DRAWINGS

Embodiments of the present disclosure will be described based on the following figures, wherein.

DESCRIPTION OF EMBODIMENTS

Figure 1:
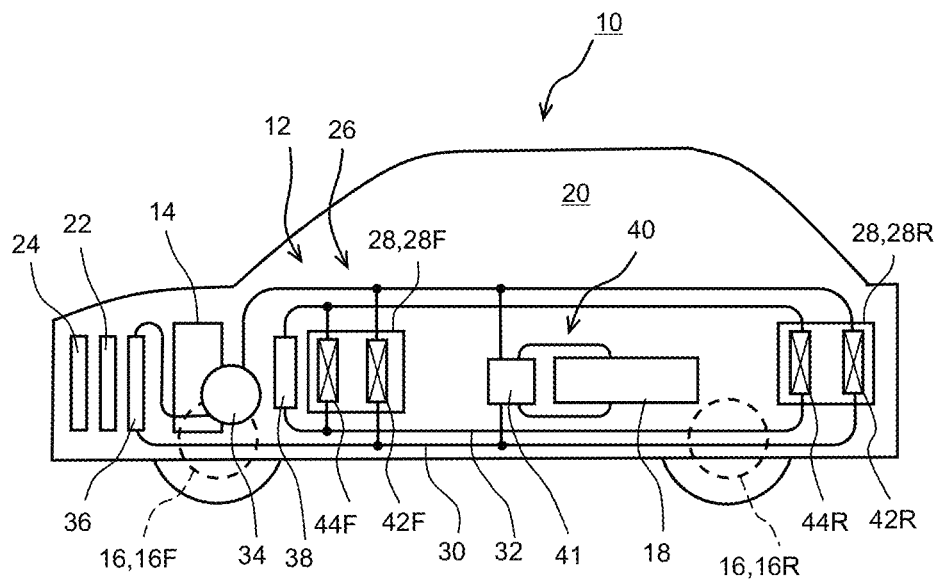
FIG. 1 illustrates a schematic structure of a vehicle that incorporates a heat management system according to an embodiment of the present disclosure.

An embodiment of the present disclosure will be described below with reference to the accompanying drawings. FIG. 1 is a schematic diagram illustrating a schematic structure of a heat management system 12 of a vehicle 10. As a prime motor for driving the vehicle 10, the vehicle 10 incorporates an engine 14 and two electric motors 16F and 16R that drive front wheels and rear wheels, respectively. The vehicle 10 incorporates a battery 18 that supplies power to the electric motors 16F and 16R. During braking, the battery 18 is charged with power generated by the electric motors 16F and 16R. The vehicle may be a vehicle with a single electric motor that drives only either front wheels or rear wheels. Further, the vehicle may be a vehicle with no engine and with one or more electric motors that drive either front wheels or rear wheels or both. For simplicity, the electric motors 16F and 16R are hereinafter simply referred to as a motor 16.

The heat management system 12 performs cooling of the engine 14, the motor 16, and the battery 18 and further performs air conditioning of a passenger compartment 20. The engine 14 has a cooling system that includes an engine radiator 22 that dissipates heat generated by the engine, using an engine cooling liquid. The engine cooling liquid flows through a pipe that connects between the engine 14 and the engine radiator 22, circulating between the engine 14 and the engine radiator 22. In FIG. 1, the pipe that connects between the engine 14 and the engine radiator 22 is not illustrated. The motor 16 has a cooling system that includes a motor radiator 24 that dissipates heat generated by the motor 16, using a motor cooling liquid. The motor cooling liquid flows through a pipe that connects between the motor 16 and the motor radiator 24, circulating between the motor 16 and the motor radiator 24. In FIG. 1, the pipe that connects between the motor 16 and the motor radiator 24 is not illustrated.

The heat management system 12 includes an air conditioner 26 that performs air conditioning of the passenger compartment 20. The air conditioner 26 has an air conditioning unit 28 that supplies air having adjusted temperature, humidity, or the like to the passenger compartment 20. The air conditioning unit 28 includes a front air conditioning unit 28F that performs air conditioning of a front seat side space of the passenger compartment 20, and a rear air conditioning unit 28R that performs air conditioning of a rear seat side space of the passenger compartment 20. The air conditioner 26 includes a refrigeration cycle circuit 30 that delivers a refrigerant to the air conditioning unit 28, and a heating circuit 32 that delivers a heated liquid to the air conditioning unit 28. The refrigeration cycle circuit 30 includes a compressor 34 that compresses a refrigerant and an exterior condenser 36 that cools the refrigerant compressed by the compressor 34 using outside air, thereby converting the refrigerant into a liquid. The compressor 34 may be an electrically powered compressor that is driven by an electric motor, and the output of the compressor 34 can be adjusted by controlling the rotational speed of the electric motor. The heating circuit 32 includes an electric heater 38 as a heat source. The refrigeration cycle circuit 30 and the heating circuit 32, including other cooling systems of the heat management system 12, will be later described in more detail.

The heat management system 12 further includes a battery cooling circuit 40 that cools the battery 18. The battery cooling circuit 40 supplies, to the battery 18, a battery cooling liquid that is cooled by the refrigerant of the refrigeration cycle circuit 30 in a battery cooling heat exchanger 41, thereby cooling the battery 18.

Figure 2:
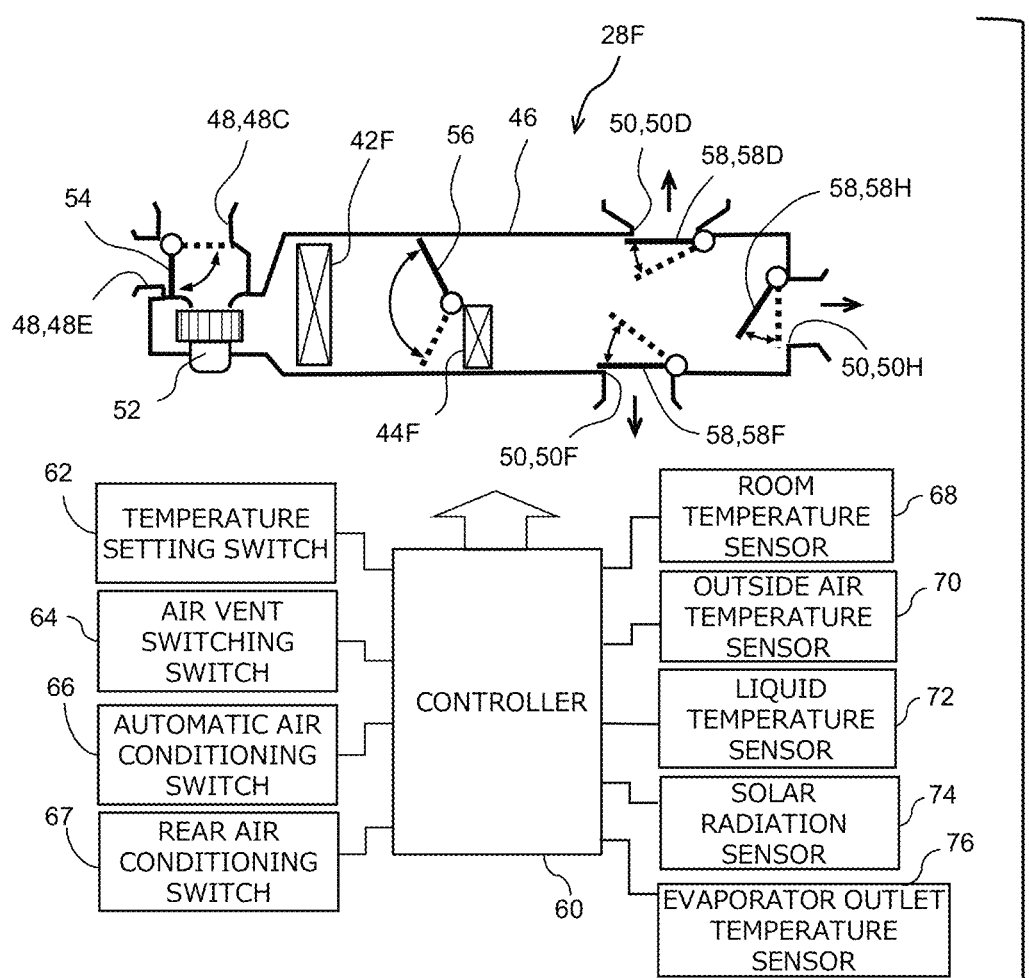
FIG. 2 illustrates a front air conditioning unit and its controller.

FIG. 2 schematically illustrates a structure of the front air conditioning unit 28F. The front air conditioning unit 28F has a front evaporator 42F constituting one of the components of the refrigeration cycle circuit 30, and a front heater core 44F constituting one of the components of the heating circuit 32, and further has a unit case 46 that houses the front evaporator 42F and the front heater core 44F. The unit case 46 has an air inlet 48 for introducing air into the unit case 46. The air inlet 48 includes an inside air inlet 48C for introducing air from inside the passenger compartment 20, and an outside air inlet 48E for introducing air from outside the vehicle. The unit case 46 has an air outlet 50 for feeding air-conditioned air toward a predetermined area in the passenger compartment 20. The air outlet 50 includes a head outlet 50H for feeding airflow toward the head and its vicinity of a passenger who is seated in a front seat, a foot outlet 50F for feeding airflow toward the feet of the front seat passenger, and a defroster outlet 50D for feeding airflow toward the interior surface of a windshield. The airflow fed from the head outlet 50H passes through a duct in an instrument panel (not illustrated) and blows toward the head and its vicinity of the front seat passenger in the passenger compartment 20 via multiple air vents formed in the instrument panel. The airflow fed from the foot outlet 50F blows toward the feet of the front seat passenger either directly from the foot outlet 50F or after passing through a duct in the instrument panel. The airflow fed from the defroster outlet 50D passes through a duct in the instrument panel and blows via an air vent provided facing the vicinity of the lower edge of the windshield. The front air conditioning unit 28F has an air blower 52 that is disposed in a portion upstream of the unit case 46. The air blower 52 produces airflow from the air inlet 48 toward the air outlet 50.

An inside/outside air switching door 54 is disposed in a portion where a flow channel from the inside air inlet 48C meets a flow channel from the outside air inlet 48E. The inside/outside air switching door 54 is pivotable between a position in which the inside air inlet 48C is closed and a position in which the outside air inlet 48E is closed, so that the mixing ratio of inside air and outside air is adjusted in accordance with the angle of pivot. An air mixing door 56 is disposed between the front evaporator 42F and the front heater core 44F. The air mixing door 56 pivots, thereby adjusting the amount of air passing through the front heater core 44F after having passed through the front evaporator 42F. For each air outlet 50, a corresponding outlet door 58 for opening and closing the air outlet 50 is provided. Specifically, a head outlet door 58H is provided for the head outlet 50H, a foot outlet door 58F is provided for the foot outlet 50F, and a defroster outlet door 58D is provided for the defroster outlet 50D, so that the amount of air blown from each outlet 50 is adjusted in accordance with the open amount of the corresponding outlet door 58.

The amount of air blown by the air blower 52, the angles of pivot of the inside/outside air switching door 54 and the air mixing door 56, and the open amount of each outlet door 58 are controlled by a controller 60. Based on conditions set by a passenger and environment conditions, the controller 60 controls the angles of pivot of the inside/outside air switching door 54 and the air mixing door 56, the open amount of each outlet door 58, and the amount of air blown by the air blower 52. The passenger sets a desired temperature using a temperature setting switch 62 and further sets an air outlet 50 through which he/she wishes to have air blown, using an air vent switching switch 64. For selection of the air outlet 50, there can be selected a blow mode such as a blow mode in which one of the air outlets 50H, 50F, and 50D is selected singly, or a blow mode in which air is blown from both of the head outlet 50H and the foot outlet 50F. The passenger can set an automatic air conditioning mode using an automatic air conditioning switch 66, and in this case, the air outlet 50 through which the controller 60 causes air to be blown in accordance with a desired temperature and environment conditions is selected according to a predetermined program. An air temperature of the passenger compartment 20 detected by a room temperature sensor 68, an outside air temperature detected by an outside air temperature sensor 70, a liquid temperature of the heating circuit 32 detected by a liquid temperature sensor 72, an amount of solar radiation entering the passenger compartment 20 detected by a solar radiation sensor 74, and the like are input to the controller 60. Further, a temperature of air that has just passed through the front evaporator 42F (evaporator outlet temperature) detected by an evaporator outlet temperature sensor 76 disposed immediately after the front evaporator 42F is input to the controller 60.

The rear air conditioning unit 28R has a structure that is almost the same as that of the front air conditioning unit 28F, and an illustration corresponding to FIG. 2 is not provided. The rear air conditioning unit 28R has a unit case that houses a rear evaporator 42R and a rear heater core 44R (see FIG. 1), and the unit case has an air inlet and an air outlet. In the rear air conditioning unit 28R, the air inlet may include no outside air inlet, and the air outlet may include no defroster outlet. As with the front air conditioning unit 28F, the rear air conditioning unit 28R can deliver air-conditioned air either toward the head and its vicinity of a passenger in a rear seat or toward the feet of the rear seat passenger, or both.

The rear air conditioning unit 28R can be switched on or off by a passenger. In response to operation of a rear air conditioning switch 67 by a passenger, the controller 60 operates not only the front air conditioning unit 28F but also the rear air conditioning unit 28R. Temperature setting and blow mode selection can be performed independently for the front air conditioning unit 28F and the rear air conditioning unit 28R.

The controller 60 is a processor that controls the air conditioner 26 according to a predetermined program, operating to achieve the temperature and air blow mode desired by the passenger in accordance with the above-described temperatures, amount of solar radiation, and the like.

Figure 3:
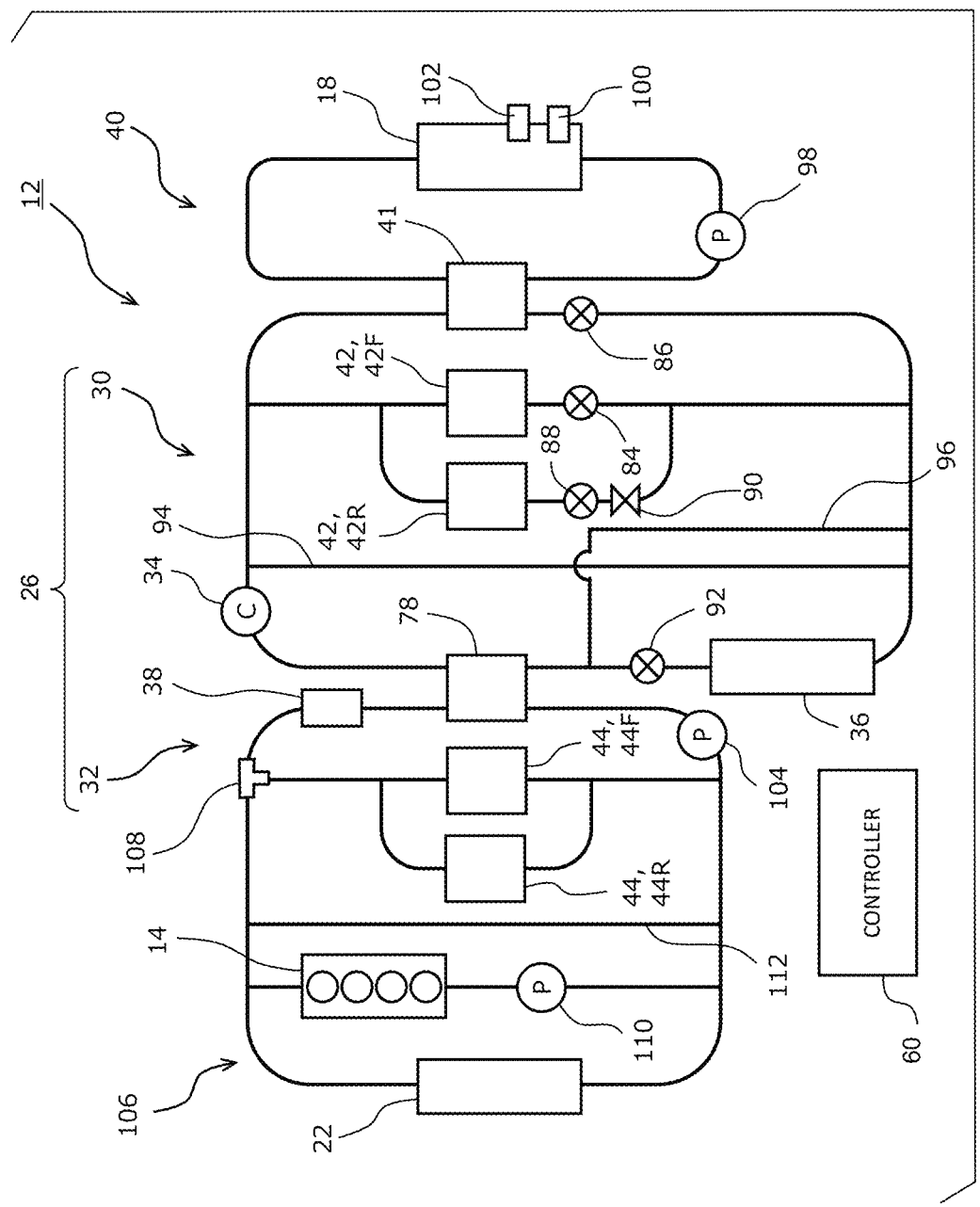
FIG. 3 schematically illustrates a structure of a heat management system according to the embodiment.

FIG. 3 schematically illustrates a structure of the heat management system 12. The components already described are denoted by the same reference numerals. The refrigeration cycle circuit 30 includes not only the compressor 34, the exterior condenser 36, and the front and rear evaporators 42F and 42R described above, but also a liquid cooling condenser 78 that exchanges heat with the heating circuit 32, and the battery cooling heat exchanger 41 that exchanges heat with the battery cooling circuit 40. The refrigeration cycle circuit 30 has electric expansion valves 84 and 86 capable of adjusting the open amount respectively located upstream of the front evaporator 42F and the battery cooling heat exchanger 41, and has an expansion valve 88 and an electromagnetic valve 90 located upstream of the rear evaporator 42R. The electric expansion valves 84 and 86 cannot be fully shut off, and even with the minimum open amount, a small amount of refrigerant is supplied to the front evaporator 42F and the battery cooling heat exchanger 41. On the other hand, supply of the refrigerant to the rear evaporator 42R can be fully stopped when the electromagnetic valve 90 is closed. Further, a heating expansion valve 92 is provided upstream of the exterior condenser 36. The heating expansion valve 92 is capable of adjusting the open amount and may be an electric expansion valve. During a heating operation of the refrigeration cycle circuit 30, the refrigerant expands as it passes through the heating expansion valve 92 with a reduced open amount, absorbing heat when it vaporizes in the exterior condenser 36. As such, during the heating operation, the exterior condenser 36 functions as an evaporator. During a cooling operation of the refrigeration cycle circuit 30, the heating expansion valve 92 is fully open, simply letting the refrigerant pass. The capacity of the refrigeration cycle circuit 30 is adjusted by adjusting the output of the compressor 34 and adjusting the open amounts of the expansion valves 84, 86, 88, and 92.

The refrigeration cycle circuit 30 has a first bypass flow channel 94 disposed in parallel with the front and rear evaporators 42F and 42R and the battery cooling heat exchanger 41. The refrigerant can bypass the front and rear evaporators 42F and 42R and the battery cooling heat exchanger 41 when it passes through the first bypass flow channel 94. The refrigeration cycle circuit 30 also has a second bypass flow channel 96 disposed in parallel with the exterior condenser 36, and the refrigerant can bypass the exterior condenser 36 when it passes through the second bypass flow channel 96.

The battery cooling circuit 40 includes the battery 18, the battery cooling heat exchanger 41, and a battery cooling circuit pump 98 for circulating a cooling liquid between the battery 18 and the battery cooling heat exchanger 41. The battery 18 is cooled as the cooling liquid cooled by the battery cooling heat exchanger 41 is delivered to the battery 18. The battery 18 has a battery temperature sensor 100 for detecting the temperature of the battery 18 and an electricity storage amount sensor 102 for detecting the amount of electricity stored in the battery 18. The level of demand to cool the battery 18 is determined based on, for example, the temperature of the battery 18, and the battery cooling circuit 40 is controlled in accordance with the determined level. The electricity storage amount sensor 102 continuously monitors power that is input and output to and from the battery 18, and input and output power values are added up to calculate a current amount of stored electricity.

The heating circuit 32 includes the electric heater 38, the front and rear heater cores 44F and 44R, the liquid cooling condenser 78, and a heating circuit pump 104 that delivers a high temperature liquid. The heating circuit pump 104 causes a circulating liquid to circulate through the electric heater 38, the front and rear heater cores 44F and 44R, and the liquid cooling condenser 78. The liquid cooling condenser 78 heats the circulating liquid of the heating circuit 32 using a high temperature refrigerant that is compressed by the compressor 34 of the refrigeration cycle circuit 30, thereby producing a high temperature liquid. The high temperature liquid, which is the circulating liquid heated either by the electric heater 38 or by the liquid cooling condenser 78, is delivered to the front and rear heater cores 44F and 44R. The heating circuit 32 shares a heating/cooling liquid with an engine cooling circuit 106, and the engine 14 can be used as a heat source. Whether the high temperature liquid delivered to the front and rear heater cores 44F and 44R is supplied from the side on which the engine 14 is located, or whether it is supplied from the side on which the electric heater 38 and the liquid cooling condenser 78 are located, is determined in response to operation of a three-way valve 108.

The engine cooling circuit 106 includes the engine 14 and the engine radiator 22, and further includes an engine cooling circuit pump 110 for circulating an engine cooling liquid between the engine 14 and the engine radiator 22. The engine cooling circuit 106 includes a radiator bypass flow channel 112 disposed in parallel with the engine radiator 22, and the engine cooling liquid can be circulated while bypassing the engine radiator 22. In a state in which the engine 14 is cold, such as while being warmed up, the engine cooling circuit 106 does not deliver the engine cooling liquid to the engine radiator 22 but circulates the engine cooling liquid through the radiator bypass flow channel 112, thereby enabling a rapid increase in temperature of the engine cooling liquid. As described above, fluid for the heating circuit 32 can also serve as the engine cooling liquid.

A flow channel through which a refrigerant or fluid flows in the refrigeration cycle circuit 30, the heating circuit 32, the battery cooling circuit 40, and the engine cooling circuit 106 is changed in accordance with predetermined conditions. A change in refrigerant or fluid flow channel is achieved not only by the three-way valve 108 and the electromagnetic valve 90 as described above, but also in response to operation of multiple valves that are not illustrated but are provided as desired for the respective circuits. The opening/closing of these valves and their open amounts may be controlled by the controller 60. In response to demands, the controller 60 also controls the output of the compressor 34, the discharge flow rate of the battery cooling circuit pump 98, and the discharge flow rate of the heating circuit pump 104.

The heat management system 12 operates in some operation modes that suit predetermined conditions. The predetermined conditions are determined based on, for example, the outside air temperature, the temperature of airflow blowing from the air conditioner 26 based on the passenger's demands (demanded blowing air temperature), and the demand to cool the battery 18 and the amount of electricity stored in the battery 18.

Figure 4:
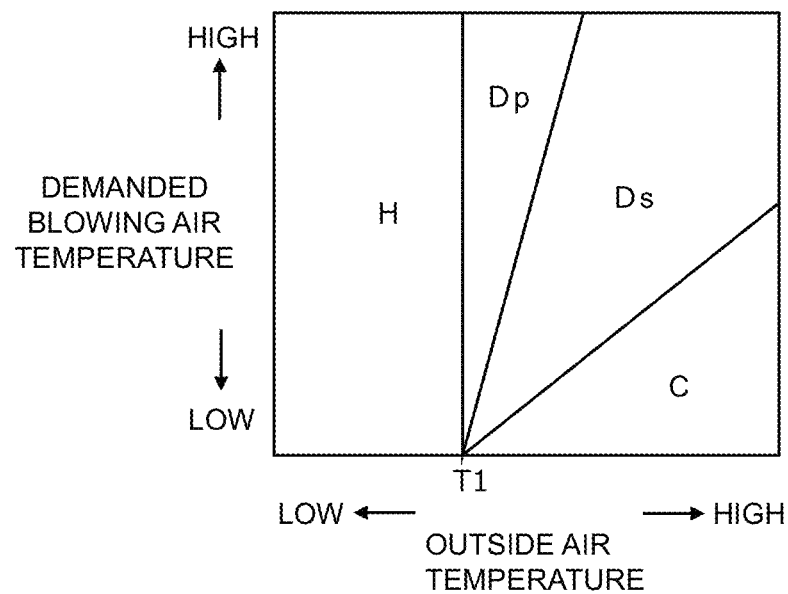
FIG. 4 illustrates conditions that define operation modes of an air conditioner.

FIG. 4 illustrates an example of conditions that define the operation mode of the heat management system 12, or, in particular, the operation mode of the air conditioner 26. The heat management system 12 operates in a heating mode; that is, performs heating operation, in a heating region H in which the outside air temperature is less than a predetermined air temperature T1 (for example, 0° C.). The heat management system 12 operates in a cooling mode; that is, performs cooling operation, in a cooling region C in which the outside air temperature is higher than the predetermined air temperature T1, the demanded blowing air temperature is low, and the difference between the demanded blowing air temperature and the outside air temperature is large. In dehumidification heating regions Dp and Ds that are intermediate between the heating region H and the cooling region C, the heat management system 12 operates in a dehumidification heating mode in which air taken into the air conditioning unit 28 is first cooled for dehumidification and then heated to the demanded blowing air temperature; that is, performs dehumidification heating operation. The dehumidification heating region includes a parallel dehumidification heating region Dp and a serial dehumidification heating region Ds. The heat management system 12 performs parallel dehumidification heating operation in the parallel dehumidification heating region Dp and performs serial dehumidification heating operation in the serial dehumidification heating region Ds. The parallel dehumidification heating operation is an operation mode used in a region in which heating is set higher than the serial dehumidification heating operation. For the front air conditioning unit 28F and the rear air conditioning unit 28R for which the demanded blowing air temperature can be set independently, the demanded blowing air temperature for a predetermined one of the air conditioning units 28, such as for the front air conditioning unit 28F, may be an element that defines the operation mode. Alternatively, the demanded blowing air temperature for the air conditioning unit 28 for which a lower temperature is set may be an element that defines the operation mode. The operation of the heat management system 12 in the respective operation modes will be described below.

Figure 5:
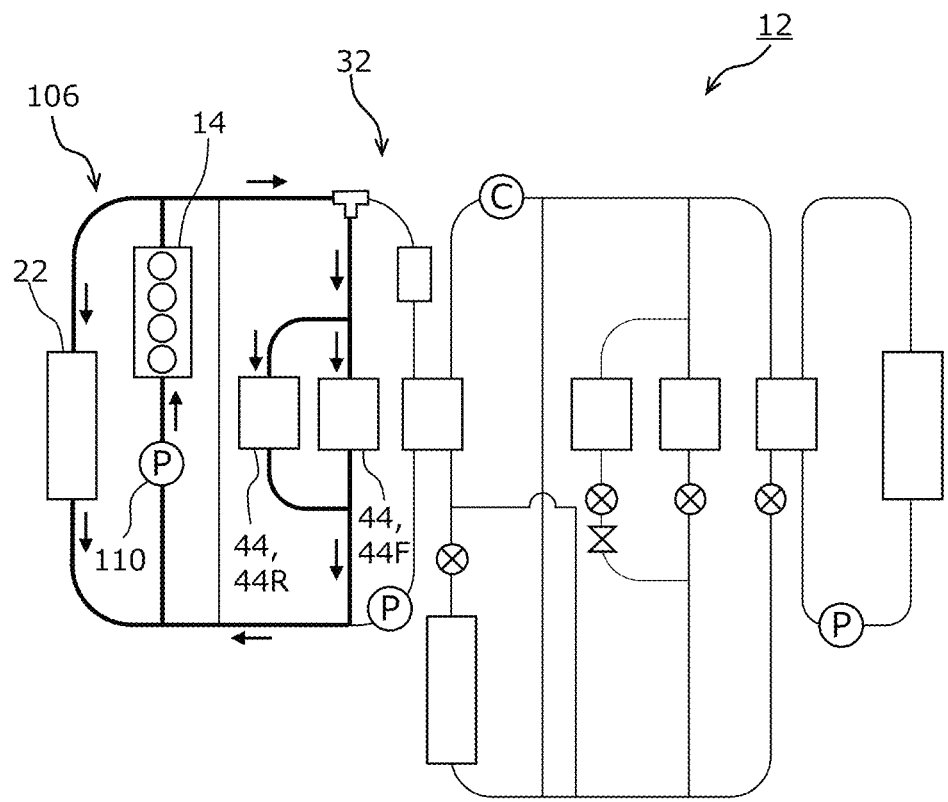
FIG. 5 illustrates an operating state of the heat management system and, in particular, illustrates a state in which a heating operation is performed using an engine cooling liquid.
Figure 6:
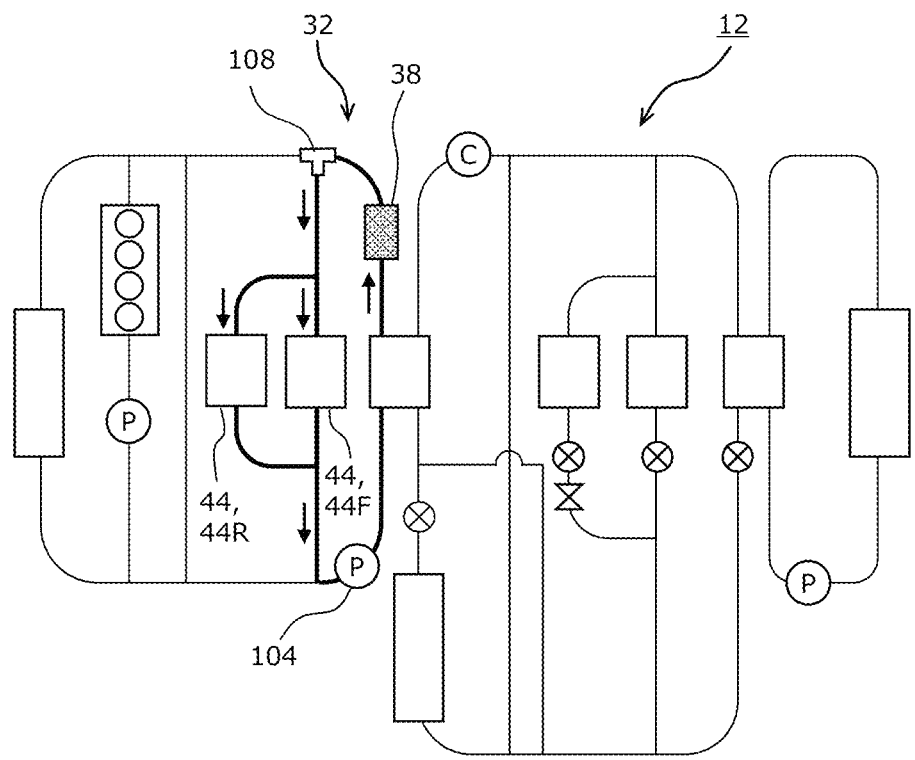
FIG. 6 illustrates an operating state of the heat management system and, in particular, illustrates a state in which a heating operation is performed using an electric heater.
Figure 7:
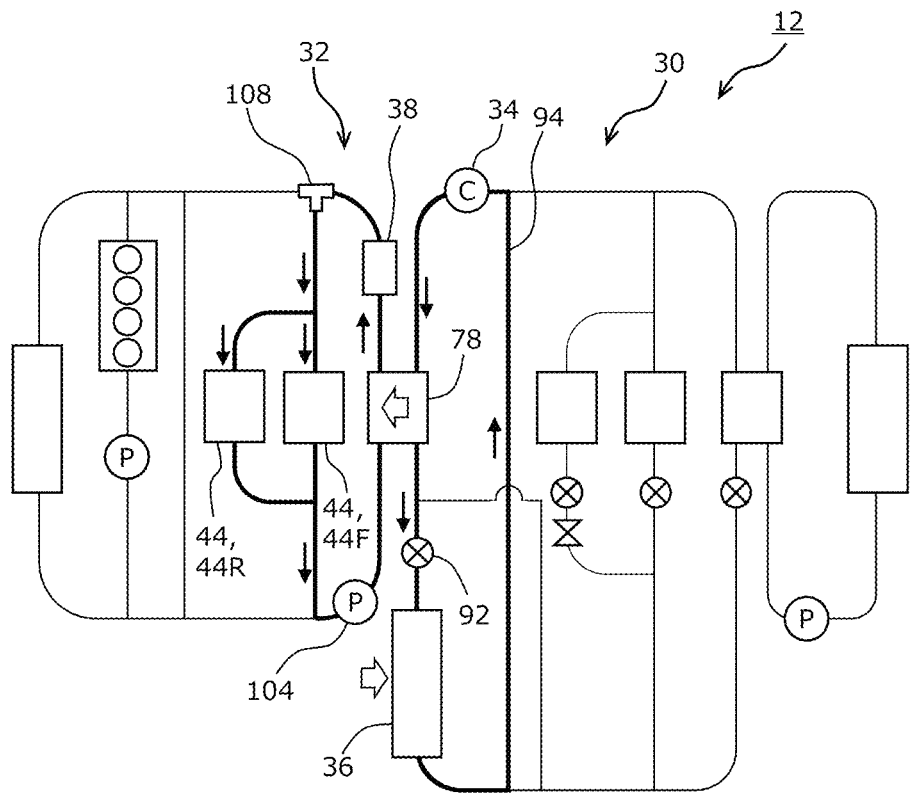
FIG. 7 illustrates an operating state of the heat management system and, in particular, illustrates a state in which a heating operation is performed using a heat pump operation of a refrigeration cycle circuit.

FIGS. 5 to 7 illustrate operating states of the heat management system 12 in the heating region H. In the following description, the front heater core 44F and the rear heater core 44R are collectively referred to as heater core 44 where particular distinction is unnecessary.

FIG. 5 illustrates an operating state observed when the temperature of a cooling liquid in the engine 14 is sufficiently high. When the temperature of the engine cooling liquid is high, some of the engine cooling liquid circulated by the engine cooling circuit pump 110 is supplied to the heater core 44. In response to operation by a passenger, the engine cooling liquid may be supplied to one or both of the front and rear heater cores 44F and 44R.

FIG. 6 illustrates an operating state observed when the temperature of the engine cooling liquid is low. When the temperature of the engine cooling liquid is low, the electric heater 38 produces a high temperature liquid, and this high temperature liquid is supplied to the heater core 44 by the heating circuit pump 104. In response to operation by a passenger, the high temperature liquid supplied from the electric heater 38 may be supplied to one or both of the front and rear heater cores 44F and 44R. For a vehicle that travels only by power from the electric motor 16 without the engine 14, heating is performed either by the electric heater 38 or by heat pump operation of the refrigeration cycle circuit 30, which will be described below.

FIG. 7 illustrates an operating state in which heating is performed through heat pump operation of the refrigeration cycle circuit 30. The refrigerant that has been compressed by the compressor 34 to have high temperature turns into a liquid in the liquid cooling condenser 78 as it is cooled by fluid circulating in the heating circuit 32. In this process, the circulating liquid in the heating circuit 32 turns into a high temperature liquid as it is heated by the high temperature refrigerant. The refrigerant in the refrigeration cycle circuit 30, which has turned into a liquid in the liquid cooling condenser 78, expands through the heating expansion valve 92 and vaporizes in the exterior condenser 36, thereby absorbing heat from outside air. That is, the exterior condenser 36 functions as an evaporator in this process. The refrigerant that has vaporized returns to the compressor 34 through the first bypass flow channel 94. The high temperature liquid heated by the liquid cooling condenser 78 is supplied to the heater core 44 by the heating circuit pump 104. In response to operation by a passenger, the high temperature liquid supplied from the electric heater 38 may be supplied to one or both of the front and rear heater cores 44F and 44R. During this heat pump operation, the passenger compartment 20 is heated using heat pumped up from outside air.

Figure 8:
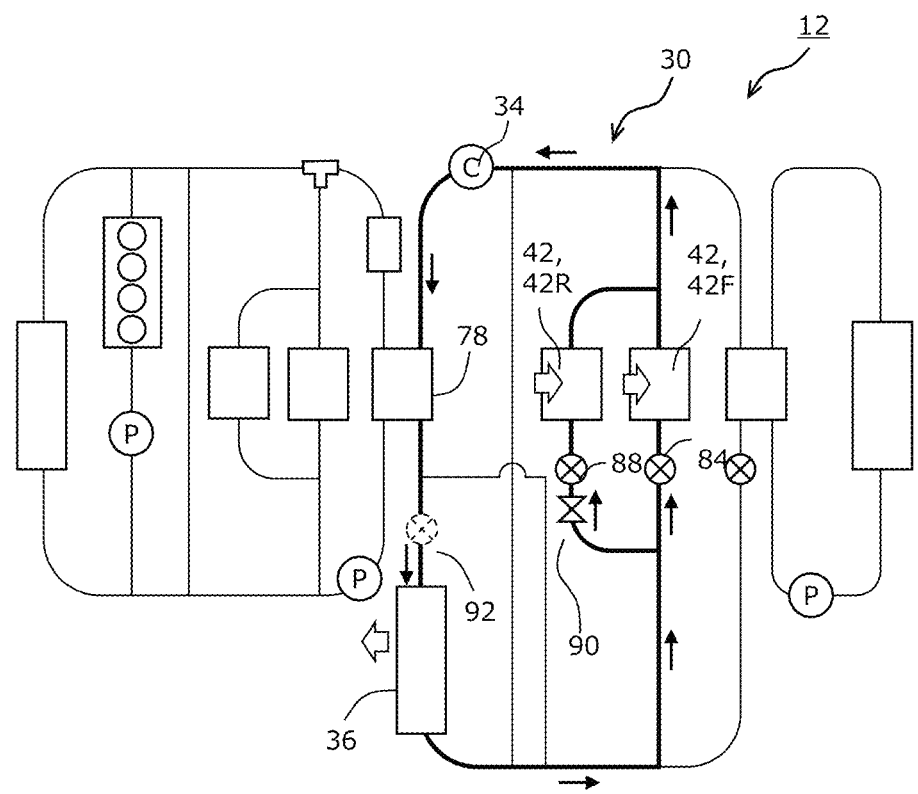
FIG. 8 illustrates an operating state of the heat management system and, in particular, illustrates a state in which a cooling operation is performed.

FIG. 8 illustrates an operating state of the heat management system 12 in the cooling region C. In the following description, the front evaporator 42F and the rear evaporator 42R are collectively referred to as evaporator 42 where particular distinction is unnecessary. The refrigerant that has been compressed by the compressor 34 dissipates heat into outside air in the exterior condenser 36, turning into a liquid as the refrigerant itself is cooled. The refrigerant that has turned into a liquid expands through the electric expansion valve 84 and the expansion valve 88 and respectively vaporizes in the front and rear evaporators 42F and 42R, thereby absorbing heat. As a result, the passenger compartment 20 is cooled. When it is unnecessary to cool the rear side of the passenger compartment 20, such as when there is no passenger in the rear seat, the electromagnetic valve 90 may be closed, thereby stopping supply of the refrigerant to the rear evaporator 42R.

Figure 9:
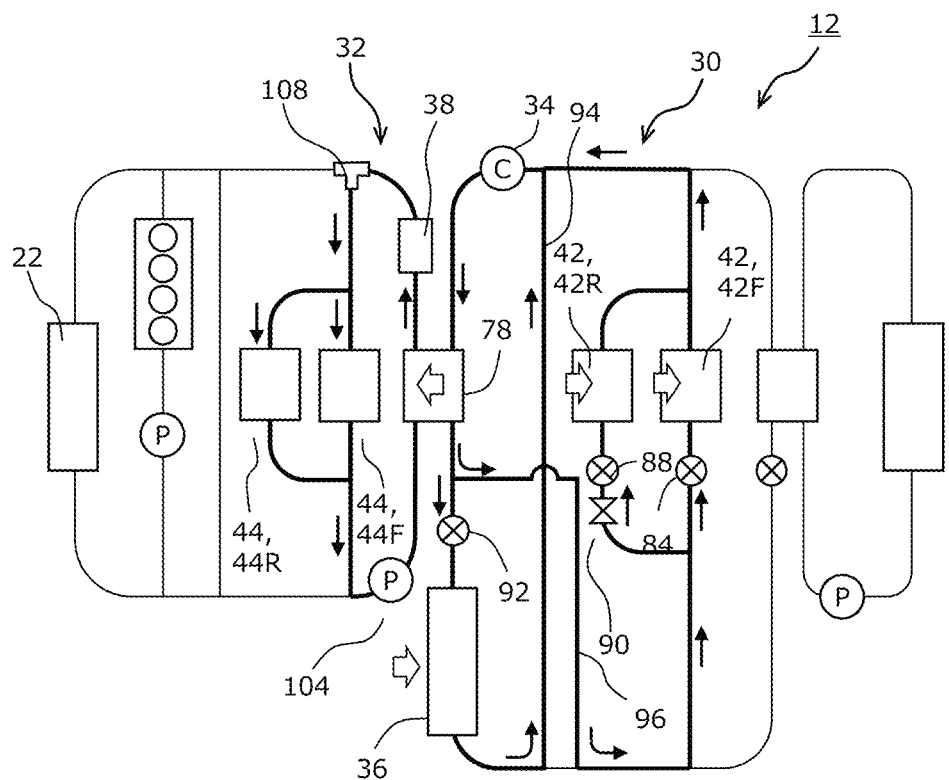
FIG. 9 illustrates an operating state of the heat management system and, in particular, illustrates a state in which a parallel dehumidification heating operation is performed.

FIG. 9 illustrates an operating state of the heat management system 12 in the parallel dehumidification heating region Dp. The refrigerant that has been compressed by the compressor 34 dissipates heat into the circulating liquid of the heating circuit 32 in the liquid cooling condenser 78. As a result, the high temperature liquid of the heating circuit 32 is produced and supplied to the heater core 44. As in the above-described heating operation, the high temperature liquid may be supplied to one or both of the front heater core 44F and the rear heater core 44R. During the parallel dehumidification heating operation, the amount of heat transferred by the refrigeration cycle circuit 30 is smaller than in the heating operation with the heat pump and the cooling operation, and thus the demand on the capacity of the refrigeration cycle circuit 30 is smaller. Therefore, the output of the compressor 34 is low, and the refrigerant that has dissipated heat in the liquid cooling condenser 78 does not fully turn into a liquid but remains in a gas-liquid two-phase state. Some of the refrigerant flows toward the exterior condenser 36 through the narrowed heating expansion valve 92, and at least some of it vaporizes in the exterior condenser 36, thereby absorbing heat. In this process, the exterior condenser 36 functions as an evaporator. The refrigerant that has passed through the exterior condenser 36 returns to the compressor 34 through the first bypass flow channel 94. The remaining portion of the refrigerant that has passed through the liquid cooling condenser 78 flows toward the evaporator 42 through the second bypass flow channel 96. In the evaporator 42, at least some of the liquid-phase refrigerant vaporizes, thereby absorbing heat. After passing through the evaporator 42, the refrigerant returns to the compressor 34. When it is unnecessary to cool the rear side of the passenger compartment 20, such as when there is no passenger in the rear seat, the electromagnetic valve 90 may be closed, thereby stopping supply of the refrigerant to the rear evaporator 42R.

In the air conditioning unit 28, air is cooled through the evaporator 42, thereby causing dehumidification as water vapor is cooled and condensed. As the cooled air is heated by the heater core 44, the air conditioning unit 28 feeds warm dry air to the passenger compartment 20.

Figure 10:
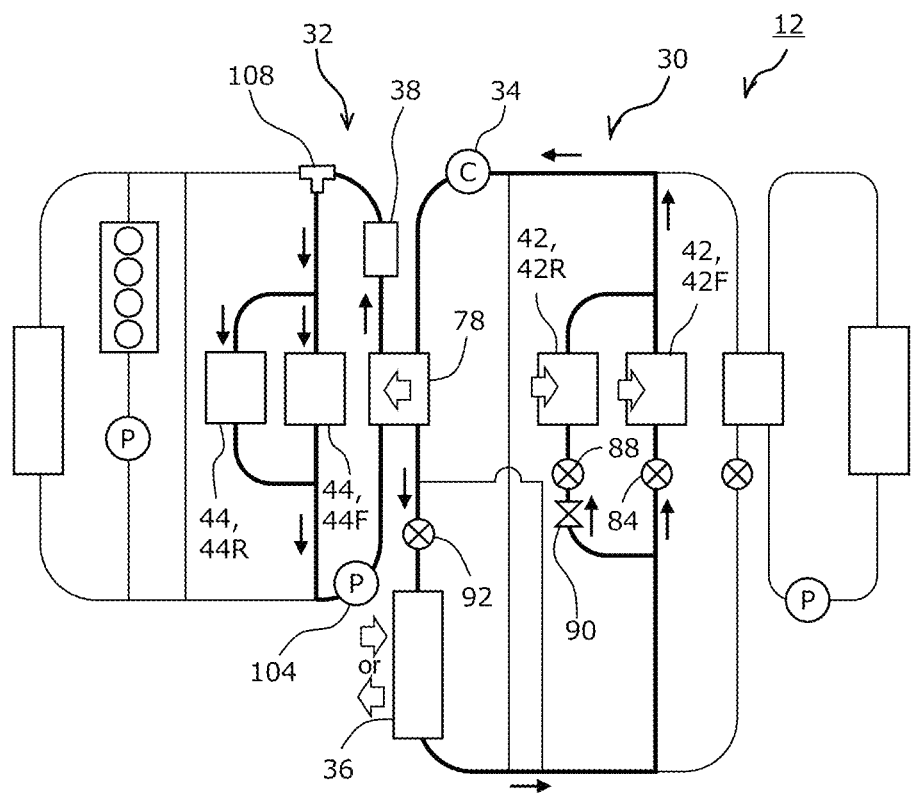
FIG. 10 illustrates an operating state of the heat management system and, in particular, illustrates a state in which a serial dehumidification heating operation is performed.

FIG. 10 illustrates an operating state of the heat management system 12 in the serial dehumidification heating region Ds. The refrigerant that has been compressed by the compressor 34 dissipates heat into the circulating liquid of the heating circuit 32 in the liquid cooling condenser 78. As a result, the high temperature liquid of the heating circuit 32 is produced and supplied to the heater core 44. As in the above-described heating operation, the high temperature liquid may be supplied to one or both of the front heater core 44F and the rear heater core 44R. The entire amount of the refrigerant that has passed through the liquid cooling condenser 78 is delivered to the exterior condenser 36. As in the parallel dehumidification heating operation, the refrigerant absorbs heat in the exterior condenser 36 when the refrigerant dissipates a large amount of heat in the liquid cooling condenser 78; that is, when heating is set high. As the open amount of the heating expansion valve 92 is narrowed, some of the refrigerant vaporizes in the exterior condenser 36, thereby absorbing heat. On the other hand, when heating can be set low, the refrigerant dissipates heat in the exterior condenser 36. In this case, the heating expansion valve 92 is set fully open. During the serial dehumidification heating operation, the amount of heat transferred by the refrigeration cycle circuit 30 is smaller than in the heating operation with the heat pump and the cooling operation, and thus the demand on the capacity of the refrigeration cycle circuit is smaller. Therefore, the output of the compressor 34 is low, and the refrigerant that has dissipated heat in the liquid cooling condenser 78 and the exterior condenser 36 does not fully turn into a liquid but remains in a gas-liquid two-phase state. The refrigerant that is in a gas-liquid two-phase state flows toward the evaporator 42. In the evaporator 42, the liquid-phase refrigerant vaporizes, thereby absorbing heat. After passing through the evaporator 42, the refrigerant returns to the compressor 34. When it is unnecessary to cool the rear side of the passenger compartment 20, such as when there is no passenger in the rear seat, the electromagnetic valve 90 may be closed, thereby stopping supply of the refrigerant to the rear evaporator 42R.

During the heating operation, the refrigeration cycle circuit 30 transfers outside heat to inside the passenger compartment 20, thereby heating the passenger compartment 20, and during the cooling operation, the refrigeration cycle circuit 30 transfers heat inside the passenger compartment 20 to outside, thereby performing cooling. During the dehumidification heating operation, the refrigeration cycle circuit 30 absorbs heat from the evaporator 42 and dissipates heat from the heater core 44 through the heating circuit 32, thereby transferring heat in the passenger compartment 20. An amount of heat corresponding to the difference between an amount of heat absorbed in the evaporator 42 and an amount of heat dissipated in the liquid cooling condenser 78 is absorbed or dissipated in the exterior condenser 36.

During the dehumidification heating operation, the amount of heat transfer is less than that in the heating operation and the cooling operation, and the output of the compressor 34 is also reduced. Therefore, the refrigerant that has dissipated heat does not fully turn into a liquid but turns into a gas-liquid two-phase state. The refrigerant that is in a gas-liquid two-phase state may be supplied to multiple targets, and this may result in an unbalanced distribution of the liquid-phase refrigerant. To cool the battery 18, the liquid-phase refrigerant should be reliably supplied to the battery cooling heat exchanger 41. In particular, the liquid-phase refrigerant may be supplied insufficiently when the refrigerant is supplied to both of the front evaporator 42F and the rear evaporator 42R and further supplied to the battery cooling heat exchanger 41.

In response to a demand to cool the battery 18 while, in the dehumidification heating regions Dp and Ds, both of the front and rear air conditioning units 28F and 28R are operating (in dual mode), the refrigeration cycle circuit 30 performs cooling operation in which the liquid-phase refrigerant is supplied to the evaporator 42, and the high temperature liquid heated by the electric heater 38 is supplied to the heater core 44. During the cooling operation of the refrigeration cycle circuit 30, the compressor 34 operates at a high output so that the refrigerant is compressed sufficiently, and the refrigerant dissipates heat in the exterior condenser 36, thereby fully turning into a liquid. As a result, a necessary amount of the liquid-phase refrigerant is supplied to the front and rear evaporators 42F and 42R and the battery cooling heat exchanger 41.

In response to an increased demand to further cool the battery 18, such as a rise in temperature of the battery 18, the output of the compressor 34 is also increased correspondingly. As such, the power for driving the compressor 34 is also increased, resulting in increased power consumption. The increased power consumption shortens the maximum driving range achievable by the electric motor 16. In this heat management system 12, when the demand to cool the battery 18 is increased, and when the amount of electricity stored in the battery 18 decreases to less than a predetermined value, such as 20%, the air conditioner 26 suspends dehumidification. Specifically, supply of the refrigerant to the front and rear evaporators 42F and 42R is suspended. As the output of the compressor 34 can be lowered due to the suspension of supply of the refrigerant to the evaporator 42, the power consumption can be lower. Without dehumidification, as the temperature of air that has passed through the evaporator 42 does not drop, less heating by the heater core 44 can be sufficient. Therefore, as the power supplied to the electric heater 38 can also be reduced, the power consumption can be lower. This can extend the maximum driving range achievable by the electric motor 16, as the reduction in amount of electricity stored in the battery 18 is retarded.

Figure 11:
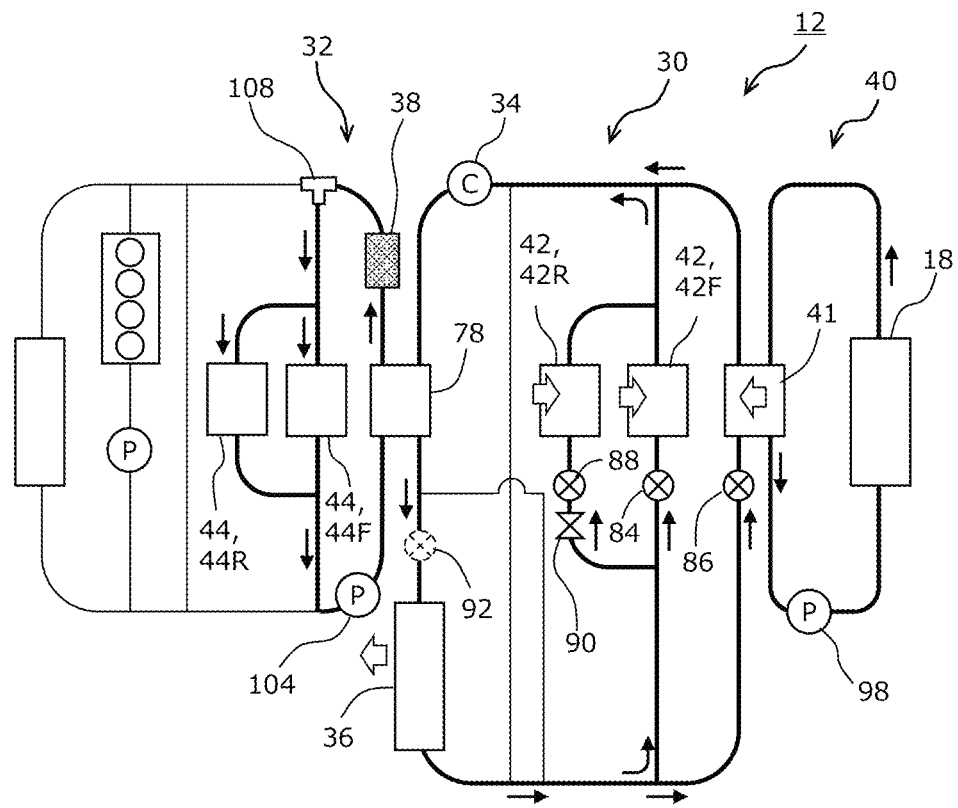
FIG. 11 illustrates an operating state of the heat management system and, in particular, illustrates a state in which front and rear air conditioning units are operating with a battery being cooled in a dehumidification heating region.

FIG. 11 illustrates an operating state of the heat management system 12 in the dehumidification heating regions Dp and Ds, in which the air conditioner 26 is operating in dual mode, and the battery cooling circuit 40 is operating. In the refrigeration cycle circuit 30, the refrigerant that has been compressed by the compressor 34 is delivered to the exterior condenser 36, where the entire amount of it turns into a liquid as it dissipates heat. The liquid-phase refrigerant is supplied to the front and rear evaporators 42F and 42R and the battery cooling heat exchanger 41. The refrigerant that has been delivered to the front and rear evaporators 42F and 42R vaporizes there, absorbing heat from air in the passenger compartment 20. The refrigerant that has been delivered to the battery cooling heat exchanger 41 vaporizes there, absorbing heat from the battery cooling liquid of the battery cooling circuit 40. On the other hand, the battery cooling liquid is cooled, and the cooled battery cooling liquid is delivered to the battery 18 and cools the battery 18. In the heating circuit 32, the electric heater 38 operates to produce the high temperature liquid, and the high temperature liquid is supplied to the heater core 44. If the temperature of the cooling liquid in the engine 14 is sufficiently high, the engine cooling liquid may be supplied to the front and rear heater cores 44F and 44R.

Figure 12:
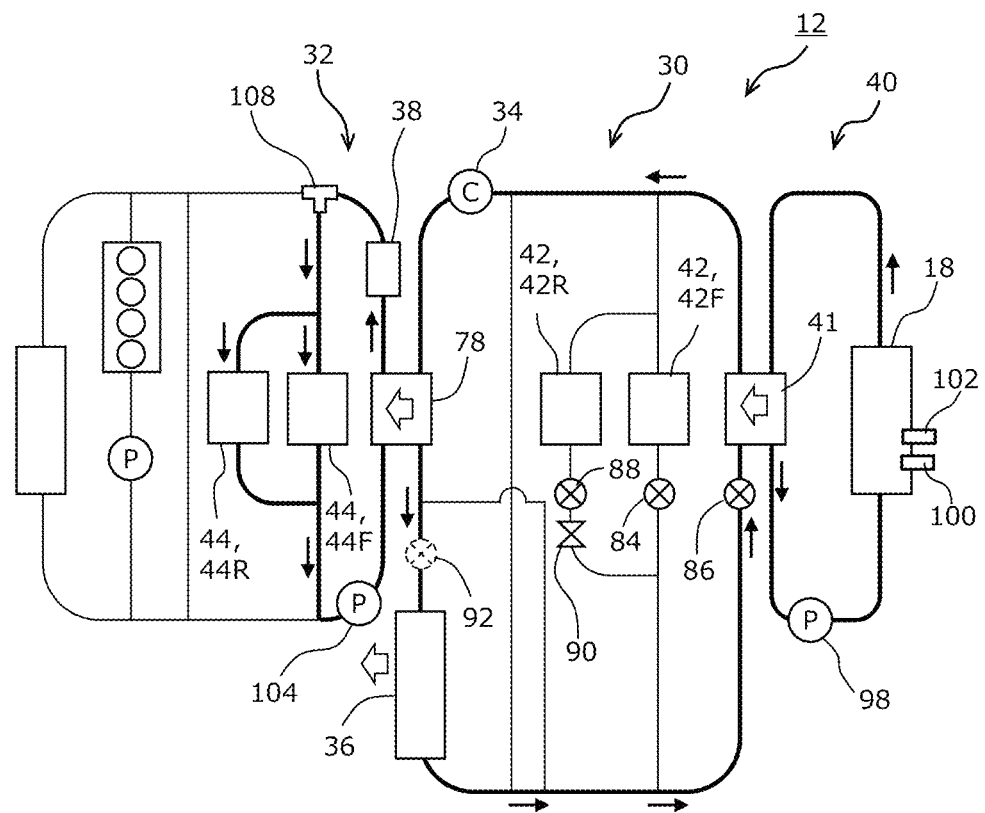
FIG. 12 illustrates an operating state of the heat management system and, in particular, illustrates a state in which the demand to cool the battery is high with the amount of stored electricity in the battery being low in a dehumidification heating region.

FIG. 12 illustrates an operating state of the heat management system 12 observed when the necessity for further cooling the battery 18 arises. In contrast to the operating state illustrated in FIG. 11, supply of the refrigerant to the front and rear evaporators 42F and 42R is suspended. The temperature of the refrigerant that has been compressed by the compressor 34 rises, thereby producing the high temperature liquid of the heating circuit 32. As the air conditioning unit 28 does not perform dehumidification, the temperature of air that has passed through the evaporator 42 does not drop, which involves being either not reheated or only slightly reheated by the heater core 44. When the heating using the refrigerant of the refrigeration cycle circuit 30 is insufficient, the electric heater 38 also heats the circulating liquid of the heating circuit 32.

Figure 13:
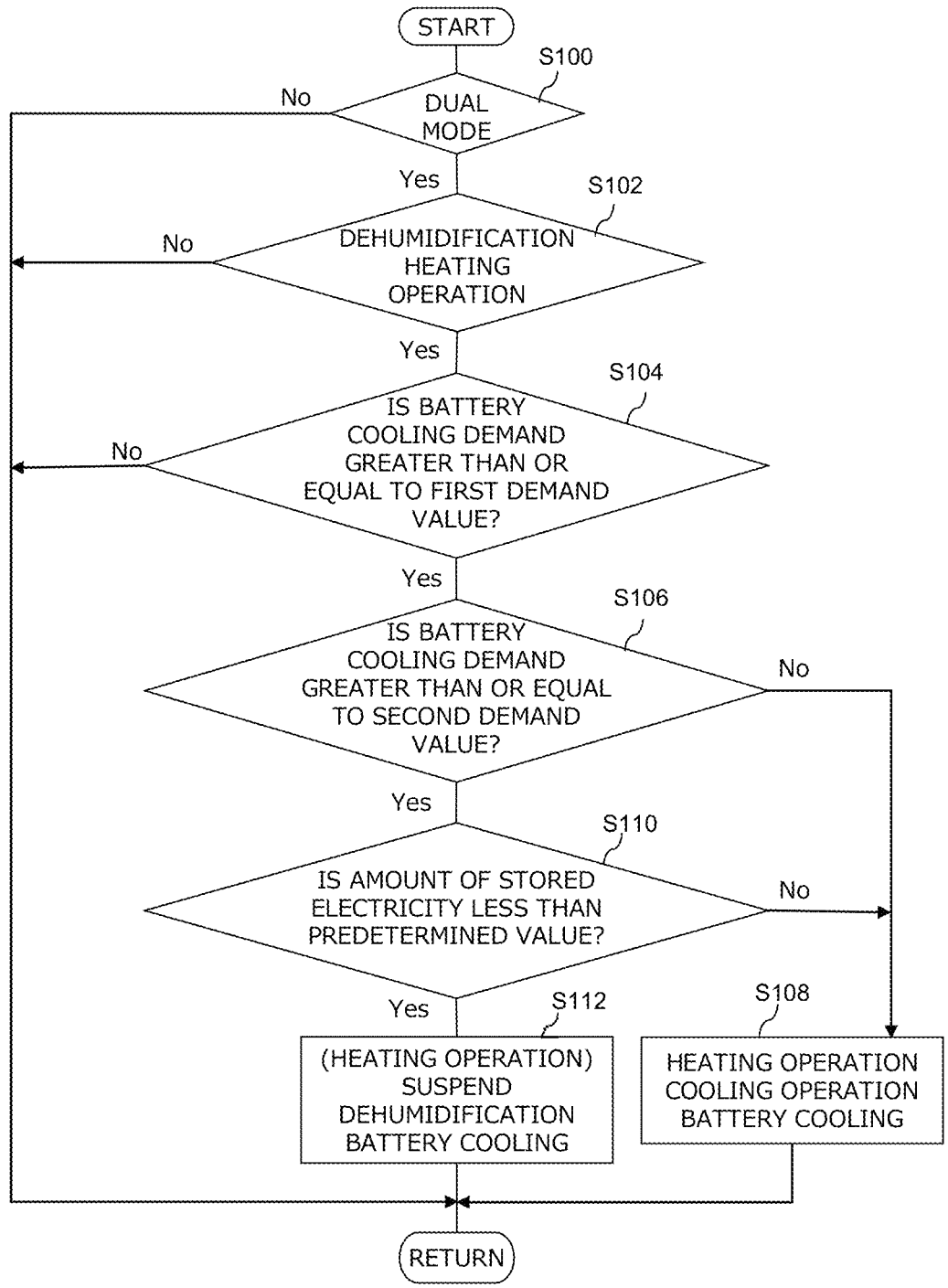
FIG. 13 illustrates part of a control flow of the heat management system.

FIG. 13 illustrates a control flow of the heat management system 12 in which the front and rear air conditioning units 28F and 28R both perform dehumidification heating operation, and in which there is a battery cooling demand. According to this control flow, the controller 60 controls the heat management system 12.

When the rear air conditioning switch 67 is on; that is, in dual mode in which the front and rear air conditioning units 28F and 28R are both operating (S100), and when the operation conditions are in the dehumidification heating region Dp or Ds (S102), the controller 60 determines whether or not there is a demand for cooling the battery (S104 and S106). When the battery cooling demand is greater than or equal to a first demand value, the controller 60 determines that the battery should be cooled using the battery cooling circuit 40 (S104). The battery cooling demand is determined based on, for example, the temperature of the battery 18 detected by the battery temperature sensor 100. When, in step S104, the battery cooling demand is less than the first demand value, the process returns to the start of this control flow. When the battery cooling demand is greater than or equal to the first demand value, the controller 60 further determines whether the battery cooling demand is greater than or equal to a second demand value (S106). The second demand value corresponds to a demand to cool the battery further than the first demand value and corresponds to, for example, a further rise in battery temperature. When, in step S106, the battery cooling demand is less than the second demand value, then as illustrated in FIG. 11, the controller 60 controls the refrigeration cycle circuit 30 to perform cooling operation and controls the heating circuit 32 to perform heating operation (S108). The controller 60 controls the refrigeration cycle circuit 30 to deliver the refrigerant to the battery cooling heat exchanger 41 of the battery cooling circuit 40, and the controller 60 further controls the battery cooling circuit 40 to deliver the cooling liquid cooled by this refrigerant to the battery 18 (S108).

Under circumstances where the refrigerant is supplied to three targets; that is, the front and rear evaporators 42F and 42R and the battery cooling heat exchanger 41, the cooling operation of the refrigeration cycle circuit 30 enables delivery of only liquid-phase refrigerant to the three targets. This enables more reliable supply of the refrigerant to three targets than with a structure in which a gas-liquid two-phase refrigerant is delivered.

When, in step S106, the battery cooling demand is greater than or equal to the second demand value, the controller 60 further determines whether the amount of electricity stored in the battery 18 is less than a predetermined value, for example, less than 20% (S110). When the amount of stored electricity is greater than or equal to the predetermined value, then the process proceeds to step S108. When the amount of stored electricity is less than the predetermined value, then the controller 60 suspends dehumidification of the air conditioner 26 (S112). Specifically, as illustrated in FIG. 12, the controller 60 controls the refrigeration cycle circuit 30 to suspend supply of the refrigerant to the front and rear evaporators 42F and 42R. The refrigeration cycle circuit 30 supplies the refrigerant only to the battery cooling heat exchanger 41. The heating circuit 32 may supply the high temperature liquid to the front and rear heater cores 44F and 44R as needed.

The suspension of dehumidification enables reduced increase in the output of the compressor 34 and also enables reduced reheating of air in the air conditioning unit 28. This enables achievement of a longer maximum driving range by the electric motor 16 with reduced power consumption of the battery 18.

REFERENCE SIGNS LIST 10 vehicle
12 heat management system
14 engine
16 electric motor
18 battery
20 passenger compartment
22 engine radiator
26 air conditioner
28 air conditioning unit
28F front air conditioning unit
28R rear air conditioning unit
30 refrigeration cycle circuit
32 heating circuit
34 compressor
36 exterior condenser
38 electric heater
40 battery cooling circuit
41 battery cooling heat exchanger
42 evaporator
42F front evaporator
42R rear evaporator
44 heater core
44F front heater core
44R rear heater core
60 controller
78 liquid cooling condenser
84, 86 electric expansion valve
88 expansion valve
90 electromagnetic valve
92 heating expansion valve
94 first bypass flow channel
96 second bypass flow channel
98 battery cooling circuit pump
100 battery temperature sensor
102 electricity storage amount sensor
104 heating circuit pump
106 engine cooling circuit
108 three-way valve

The invention claimed is:

1. A heat management system for a vehicle, the heat management system comprising:
a front air conditioning unit configured to perform air conditioning of a front side space of a passenger compartment of the vehicle;
a rear air conditioning unit configured to perform air conditioning of a rear side space of the passenger compartment;
a battery cooling circuit configured to circulate a cooling liquid for cooling a battery from which power is supplied to an electric motor for driving the vehicle;
a refrigeration cycle circuit configured to supply a refrigerant to the front air conditioning unit and the rear air conditioning unit and configured to supply the refrigerant to a battery cooling heat exchanger for exchanging heat between the cooling liquid of the battery cooling circuit and the refrigerant; and
a heating circuit configured to produce a high temperature liquid using a heat source or the refrigerant of the refrigeration cycle circuit and configured to supply the high temperature liquid to the front air conditioning unit and the rear air conditioning unit,
wherein, when the front air conditioning unit and the rear air conditioning unit are operating in a dehumidification heating operation region determined based on an outside air temperature and a demanded blowing air temperature representing a target value to which a temperature of air fed from the front air conditioning unit and the rear air conditioning unit is controlled, and when a demand to cool the battery is greater than or equal to a first demand value,
the refrigeration cycle circuit performs cooling operation to supply the refrigerant to the front air conditioning unit, the rear air conditioning unit, and the battery cooling heat exchanger,
the heating circuit produces the high temperature liquid using the heat source, and the battery cooling circuit cools the battery using the cooling liquid cooled by the refrigerant of the refrigeration cycle circuit through the battery cooling heat exchanger,
wherein, when the demand to cool the battery is greater than or equal to a second demand value that is higher than the first demand value, and when an amount of electricity stored in the battery is less than a predetermined value, supply of the refrigerant to the front air conditioning unit and the rear air conditioning unit by the refrigeration cycle circuit is suspended.

2. The heat management system for a vehicle according to claim 1, wherein the refrigeration cycle circuit includes a compressor configured to compress the refrigerant and an exterior heat exchanger configured to exchange heat with outside air, thereby enabling, during the cooling operation, the total amount of the refrigerant that has been compressed by the compressor and discharged to pass through the exterior heat exchanger and turn into a liquid.

3. The heat management system for a vehicle according to claim 1, wherein the heat source of the heating circuit comprises one or both of an engine for driving the vehicle and an electric heater.

\* \* \* \* \*